United States Patent
Sugiyama

(10) Patent No.: US 9,535,213 B2
(45) Date of Patent: Jan. 3, 2017

(54) OPTICAL MODULE WITH COVER MATERIAL COVERING PART OF ELECTRODE PORTION AND SIGNAL LINE

(71) Applicant: Fujitsu Optical Components Limited, Kawasaki-shi, Kanagawa (JP)

(72) Inventor: Masaki Sugiyama, Sagamihara (JP)

(73) Assignee: FUJITSU OPTICAL COMPONENTS LIMITED, Kawasaki (JP)

(*) Notice: Subject to any disclaimer, the term of this patent is extended or adjusted under 35 U.S.C. 154(b) by 0 days.

(21) Appl. No.: 14/619,883

(22) Filed: Feb. 11, 2015

(65) Prior Publication Data

US 2015/0261062 A1    Sep. 17, 2015

(30) Foreign Application Priority Data

Mar. 12, 2014 (JP) ................. 2014-048864

(51) Int. Cl.
*G02B 6/12* (2006.01)
*G02F 1/225* (2006.01)
*G02F 1/21* (2006.01)

(52) U.S. Cl.
CPC .............. *G02B 6/12* (2013.01); *G02F 1/2255* (2013.01); *G02B 2006/12142* (2013.01); *G02F 2001/212* (2013.01)

(58) Field of Classification Search
CPC .............. G01H 11/08; H01L 27/14621; H01L 27/1214; H03H 9/0576; G06K 19/07718; G02B 6/4201; H01P 5/08
USPC ................. 385/1–14; 257/428, 778; 438/149
See application file for complete search history.

(56) References Cited

U.S. PATENT DOCUMENTS

| | | | | |
|---|---|---|---|---|
| 6,270,263 B1 * | 8/2001 | Iwase | ................... | G02B 6/4292 385/14 |
| 6,373,116 B1 * | 4/2002 | Teranuma | ........... | H01L 27/1214 257/428 |
| 6,608,946 B2 * | 8/2003 | Kikuchi | ............. | G02B 6/12002 385/129 |
| 7,151,866 B2 * | 12/2006 | Oikawa | ................... | G02F 1/125 385/14 |
| 7,183,581 B2 * | 2/2007 | Nagai | ................. | H01S 5/02252 257/80 |
| 7,193,490 B2 * | 3/2007 | Shimoda | ................... | H01P 5/08 333/236 |
| 7,260,285 B2 * | 8/2007 | Mitamura | ............ | G02B 6/4201 385/14 |
| 8,870,470 B2 * | 10/2014 | Yasuda | .................... | G02B 6/12 385/53 |
| 2005/0093172 A1 * | 5/2005 | Tsukahara | ........ | G06K 19/07718 257/778 |
| 2005/0146397 A1 * | 7/2005 | Koga | ................... | H03H 9/0576 333/133 |

(Continued)

FOREIGN PATENT DOCUMENTS

JP    2007-123744    5/2007
JP    2012-182173    9/2012

*Primary Examiner* — Akm Enayet Ullah
(74) *Attorney, Agent, or Firm* — Staas & Halsey LLP

(57) ABSTRACT

An optical module includes: a substrate; a wiring pattern; and a cover material. The wiring pattern includes, on the substrate, an electrode portion having a predetermined width and a signal line having a width smaller than the predetermined width and connected to the electrode portion. The cover material covers a part of the electrode portion and the signal line.

5 Claims, 6 Drawing Sheets

(56) References Cited

U.S. PATENT DOCUMENTS

| | | | |
|---|---|---|---|
| 2006/0166411 A1* | 7/2006 | Morisue | H01L 27/14621 438/149 |
| 2010/0215324 A1* | 8/2010 | Ban | G02B 6/4201 385/88 |
| 2012/0114340 A1* | 5/2012 | Sugiyama | G02B 6/4201 398/200 |
| 2014/0116147 A1* | 5/2014 | Endo | G01H 11/08 73/658 |
| 2015/0362823 A1* | 12/2015 | Sugiyama | G02F 1/225 385/3 |
| 2016/0011480 A1* | 1/2016 | Pradhan | G02F 1/1525 359/265 |

* cited by examiner

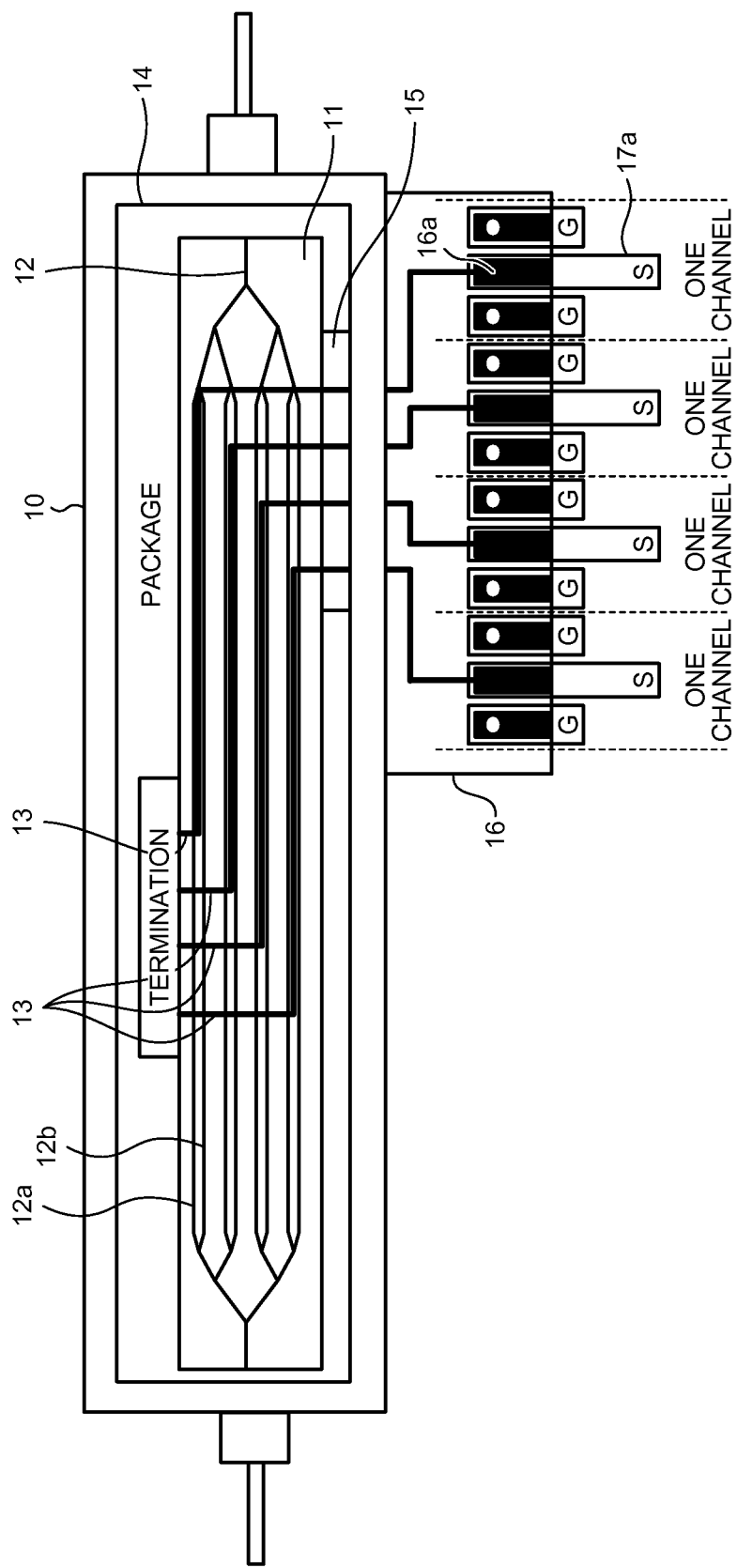

OPTICAL MODULE WITH COVER MATERIAL COVERING PART OF ELECTRODE PORTION AND SIGNAL LINE

CROSS-REFERENCE TO RELATED APPLICATION

This application is based upon and claims the benefit of priority of the prior Japanese Patent Application No. 2014-048864, filed on Mar. 12, 2014, the entire contents of which are incorporated herein by reference.

FIELD

The embodiments discussed herein are related to an optical module.

BACKGROUND

In recent years, an increase in the modulation speed and an increase in the configuration scale of an optical module such as an optical modulator have been in progress along with an increase in the capacity of an optical transmission system. Therefore, in an optical transmitter with an optical module mounted therein, it is desirable that a plurality of Mach-Zehnders forming optical waveguides be integrated in a single chip in order to achieve a size reduction. In an optical module, optical waveguides are formed in parallel with one another by four Mach-Zehnders, for example. Two signal electrodes and two ground electrodes are patterned on each of the optical waveguides. The optical module generates a multilevel-modulated signal by inputting electric signals different from each other to the two signal electrodes. In such an optical module, all the electric signal input units are disposed on one side of a package in order to facilitate the mounting of the input unit (such as a coaxial connector) and to reduce the mounting area thereof.

In the optical module with the input units disposed on one side thereof, an electric signal such as an RF (Radio Frequency) signal is inputted thereto via a coaxial connector provided on the side surface of the package. Moreover, a coaxial adaptor for inputting an external electric signal is connected to the coaxial connector. The optical module, however, needs to increase a pitch between the signal electrodes to which electric signals are inputted according to the width of the coaxial adaptor. Thus, when the number of channels is increased, the mounting area is correspondingly increased.

In order to suppress the aforementioned increase in mounting area, a surface-mount optical module in which an electric signal is inputted from a PCB (Printed Circuit Board) side via an FPC (Flexible Printed Circuit) provided in a package has been developed. In such an optical module, an electrode pattern on the PCB and an electrode pad on the FPC are connected to each other with a solder in order to input an electric signal thereto. This eliminates a need for the coaxial adaptor. Thus, a pitch between the signal electrodes to which electric signals are inputted can be reduced, thereby reducing the mounting area thereof. As a result, a reduction in the size of the optical transmitter can be achieved.

In an optical module handling high-frequency signals such as an optical modulator, however, if an impedance mismatch is generated at a connection between an electrode pattern on a PCB and an electrode pad on an FPC, the reflection of a high-frequency signal is increased, thereby deteriorating the high-frequency characteristics thereof. In order to prevent this, it is desirable that the optical module be designed so that the characteristic impedance of each signal electrode at the connection approximately equals an ideal value of 50Ω.

Patent Document 1: Japanese Laid-open Patent Publication No. 2007-123744 and Patent Document 2: Japanese Laid-open Patent Publication No. 2012-182173 are introduced as the Rerated Art Document.

Two ground patterns are formed in parallel to each other on a rear surface of an FPC (a side adjacent to a PCB) so as to interpose one signal pattern therebetween. While a width of the signal pattern is set so that the characteristic impedance at the aforementioned connection equals 50Ω, the width varies depending on a component part thereof. More specifically, an electrode pad portion of the signal pattern has a width of about several hundred μm since the electrode pad portion is soldered to the electrode pattern on the PCB. A microstripline (MSL) portion extending toward a package side, on the other hand, has a width of only about several ten to 100 μm since no soldering is made.

In view of this, the microstripline portion of the aforementioned signal pattern is covered by a cover material (for example, a coverlay) in order to prevent the separation thereof or the like. In order to protect the microstripline and obtain the characteristic impedance of 50Ω, it is desirable that an end of the cover material on the electrode pad side coincide with a boundary between the electrode pad and the microstripline. However, the cover material tends to vary from product to product since the positional accuracy of outer shape machining or bonding in a manufacturing process of the cover material is generally as low as about several hundred μm. Therefore, there is a risk that part of the microstripline is not covered by the cover material due to a manufacturing error thereof such as tolerance and therefore is exposed. Such an exposure of the microstripline becomes a factor of disconnection due to the separation thereof.

SUMMARY

According to an aspect of the embodiments, an optical module includes: a substrate; a wiring pattern that includes, on the substrate, an electrode portion having a predetermined width and a signal line having a width smaller than the predetermined width and connected to the electrode portion; and a cover material that covers a part of the electrode portion and the signal line.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a top view illustrating a configuration of an optical module according to a present embodiment;

DESCRIPTION OF EMBODIMENTS

Figure 2A:
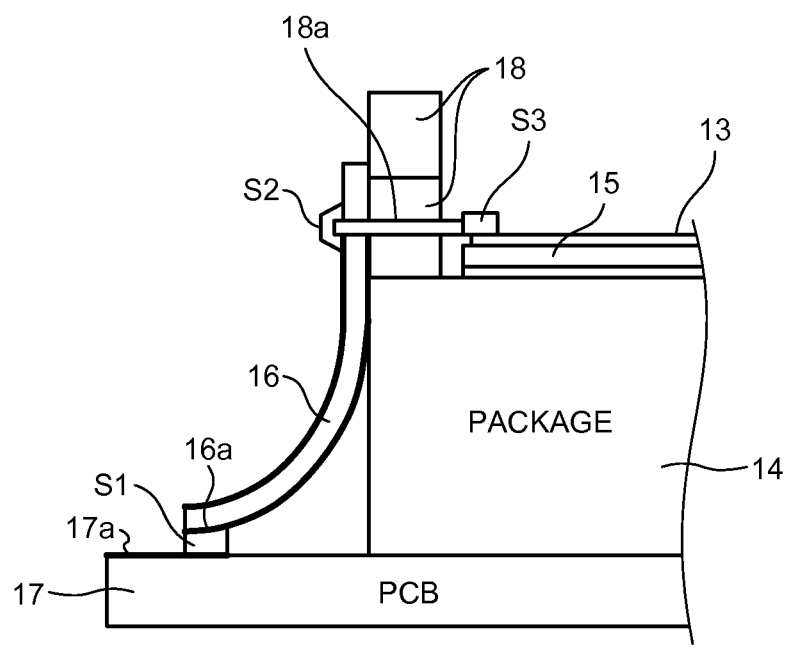
FIG. 2A is a partial cross-sectional view illustrating an example of a connection between a PCB and an FPC.

Preferred embodiments will be explained with reference to accompanying drawings. Note that the optical module disclosed by the present application is not limited to the following embodiments.

A configuration of an optical module according to an embodiment disclosed by the present application will be described first. FIG. 1 is a top view illustrating the configuration of an optical module 10 according to the present embodiment. As illustrated in FIG. 1, the optical module 10 is formed by providing electrodes 13 in the vicinity of optical waveguides 12 formed on a crystal substrate 11. The crystal substrate 11 is made of an electro-optic crystal such as $LiNbO_3$ (LN) or $LiTaO_2$. The optical waveguide 12 is formed by forming a metal film such as Ti and subjecting the metal film to thermal diffusion or by performing patterning and then proton exchange in benzoic acid. The optical waveguides 12 constitute a Mach-Zehnder interference system and the electrodes 13 are provided on the parallel waveguides of the Mach-Zehnder.

Since the electrode 13 utilizes a refractive index change due to an electric field in a z-axis direction, the electrode 13 is disposed directly above the optical waveguide 12. The electrode 13 is a coplanar electrode formed by patterning a signal electrode and a ground electrode on the optical waveguide 12. In order to prevent light propagating through the optical waveguide 12 to be absorbed by the signal electrode and the ground electrode, the optical module 10 has a buffer layer between the crystal substrate 11 and the electrode 13. The buffer layer is made of $SiO_2$ or the like with a thickness of about 0.2 to 2 μm.

When the optical module 10 is driven at high speed, terminations of the signal electrode and the ground electrode are connected to each other with a resistor so as to form a traveling-wave electrode and a microwave signal is applied to an input side thereof. At this time, the refractive indexes of the two optical waveguides 12 (for example, optical waveguides 12a and 12b) constituting a Mach-Zehnder are changed by +Δna and −Δnb, respectively, for example, due to the electric field. Along with such a change, a phase difference between the optical waveguides 12 is also changed. As a result, a phase-modulated signal light is outputted from the optical waveguide 12 due to Mach-Zehnder interference. The optical module 10 can obtain a high-speed optical response property by controlling the effective refractive index of the microwave by means of changing a cross-sectional shape of the electrode 13 so as to match the speeds of the light and the microwave.

According to the optical module 10, a package 14 housing the crystal substrate 11, the optical waveguide 12, and the electrode 13 is provided with an FPC 16 via a relay board 15 as illustrated in FIG. 1. If a high-frequency wave propagation loss is large in the electrode on the FPC 16, the modulation bandwidth is narrowed, thereby increasing the drive voltage thereof. Thus, in the optical module 10 handling high-frequency signals, it is desirable that the FPC 16 have a shortest possible length in order to reduce the high-frequency wave loss. Moreover, a PCB is connected to the FPC 16. If an impedance mismatch is generated in this connection, however, the reflection of the high-frequency signal is increased and the transmission frequency bandwidth is therefore narrowed. In order to prevent this, it is important that a characteristic impedance at a connection between an electrode pad 16a on the FPC 16 and an electrode pattern 17a of the PCB approximates 50Ω as close as possible.

An electric signal such as an RF signal outputted from the electrode pattern 17a of the PCB is inputted into the electrode 13 via the electrode pad 16a of the FPC 16 attached to the package 14. The PCB (electrode pattern) and the FPC 16 (electrode pad) are connected to each other with a solder. Therefore, as compared with the case where a coaxial adapter is employed, the pitch between the electrode pads 16a can be narrowed, thereby allowing for high-density mounting.

FIG. 2A is a partial cross-sectional view illustrating an example of the connection between a PCB 17 and the FPC 16. As illustrated in FIG. 2A, the electrode pattern 17a of the PCB 17 and one end (electrode pad 16a side) of the FPC 16 are connected to each other with a solder S1. The FPC 16 extends upwardly and is in contact with the package 14 at the other end thereof. Also, the FPC 16 is fixed to a coaxial connector 18 on the package 14 by means of a lead pin 18a and solders S2 and S3. Moreover, the FPC 16 is electrically connected to the relay board 15 and the electrode 13 via the lead pin 18a. This enables an electric signal such as an RF signal inputted into the electrode pad 16a from the electrode pattern 17a to reach the lead pin 18a via the FPC 16 and then flow through the electrode 13 via the relay board 15.

Figure 2B:
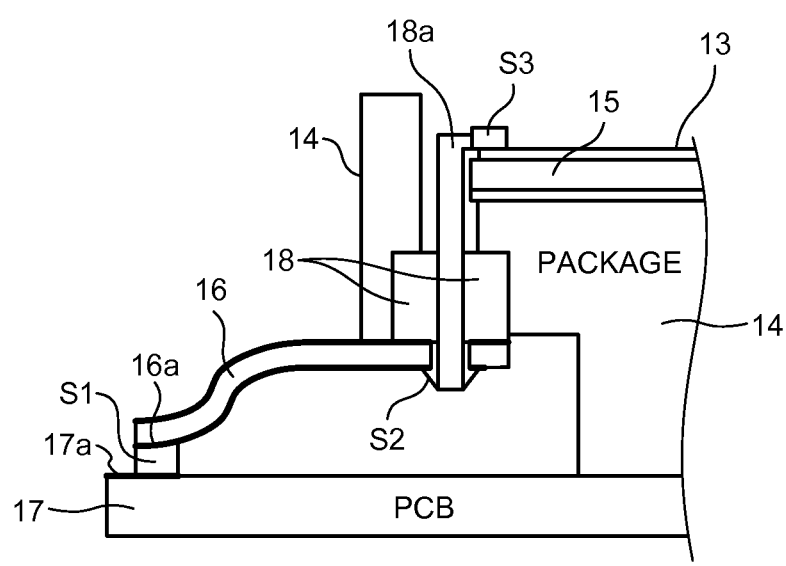
FIG. 2B is a partial cross-sectional view illustrating another example of the connection between the PCB and the FPC.

FIG. 2B is a partial cross-sectional view illustrating another example of the connection between the PCB 17 and the FPC 16. As illustrated in FIG. 2B, the electrode pattern 17a of the PCB 17 and one end (electrode pad 16a side) of the FPC 16 are connected to each other with the solder S1. The FPC 16 extends laterally and is in contact with the package 14 at the other end thereof. Also, the FPC 16 is fixed to the coaxial connector 18 interposed between the packages 14 by means of the lead pin 18a and the solders S2 and S3. Moreover, the FPC 16 is electrically connected to the relay board 15 and the electrode 13 via the lead pin 18a. This enables an electric signal such as an RF signal inputted into the electrode pad 16a from the electrode pattern 17a to reach the lead pin 18a via the FPC 16 and then flow through the electrode 13 via the relay board 15.

In any of these configurations illustrated in FIGS. 2A and 2B, it is desirable that the length of the electrode pad 16a of the FPC 16 be as short as about 1 mm in order to suppress the propagation loss of the electric signal.

Figure 3:
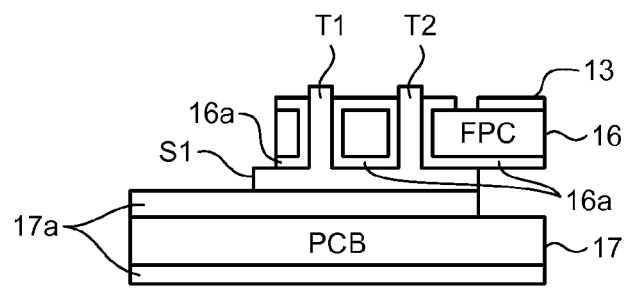
FIG. 3 is an enlarged cross-sectional view illustrating a connection between the PCB and the FPC according to the present embodiment.

FIG. 3 is an enlarged cross-sectional view illustrating a connection between the PCB 17 and the FPC 16 according to the present embodiment. As illustrated in FIG. 3, in the FPC 16 of the optical module 10 according to the present embodiment, the electrode pads 16a formed on the front surface and rear surface thereof are electrically connected to each other via two through holes T1 and T2. In the PCB 17, on the other hand, the electrode patterns 17a are formed on the front surface and rear surface thereof. The electrode pad 16a on the rear surface of the FPC 16 and the electrode pattern 17a on the front surface of the PCB 17 are electrically connected to each other with the solder S1.

Figure 4:
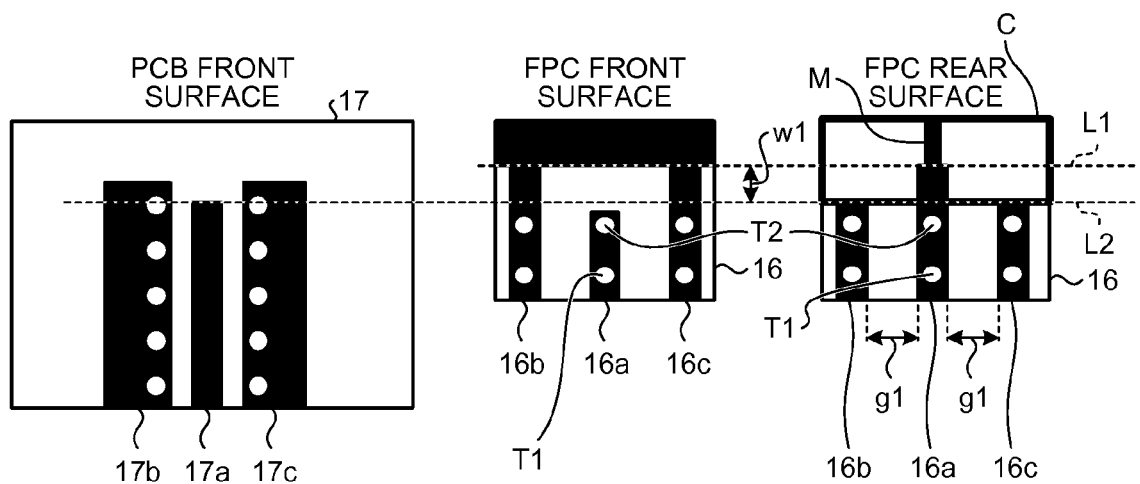
FIG. 4 is a diagram illustrating the front surface of the PCB and the front surface and rear surface of the FPC according to the present embodiment.

FIG. 4 is a diagram illustrating the front surface of the PCB 17 and the front surface and rear surface of the FPC 16 according to the present embodiment. As illustrated in FIG. 4, two ground patterns 17b and 17c are formed on both sides of the electrode pattern 17a serving as a signal pattern on the front surface of the PCB 17 so as to be parallel to the electrode pattern 17a. On the other hand, two ground patterns 16b and 16c are formed on both sides of the electrode pad 16a serving as a signal pattern on the front surface of the FPC 16 so as to be parallel to the electrode pad 16a. These two ground patterns 16b and 16c are connected to each other on an upper side (package 14 side) of the FPC 16. The electrode pad 16a and two ground patterns 16b and 16c are formed on the rear surface of the FPC 16 at positions corresponding to the patterns on the front surface thereof. Furthermore, a cover material C is provided on the rear surface of the FPC 16 so as to cover a microstripline M and part of the electrode pad 16a. Note that the cover material C may be provided also on the front surface of the FPC 16.

As illustrated in FIG. 4, on the rear surface of the FPC 16, a tip of the cover material C extends downwardly (PCB 17 side) to a position covering the part of the electrode pad 16a past the microstripline M. In other words, the tip (lower side) of the cover material C was positioned on a boundary between the electrode pad 16a and the microstripline M indicated by a broken line L1 in related techniques. Therefore, depending on a manufacturing error of the cover material C, there were cases where the tip of the cover material C did not reach the broken line L1, thereby failing to completely cover the microstripline M by the cover material C. As a result, there was a risk of disconnection due to the separation of the microstripline M from the FPC 16. In view of this, the tip of the cover material C extends to the position of the tips of the ground patterns 16b and 16c indicated by a broken line L2 positioned downward of the broken line L1 in the optical module 10 according to the present embodiment. This achieves the complete covering of the microstripline M by the cover material C regardless of the manufacturing error thereof. As a result, disconnection due to the separation of the microstripline M is avoided.

While the position of the tip (lower end) of the cover material C coincides with the position of the tips (upper ends) of the ground patterns 16b and 16c in FIG. 4, the position of the tip of the cover material C is not necessarily limited thereto. In other words, the tip of the cover material C may be at any position as long as being positioned downward (ground patterns 16b and 16c side) of the broken line L1. The width to extend the cover material C is variably determined depending on the manufacturing error of the cover material C. For example, when the manufacturing error of the cover material C falls within ±300 μm, an extended width w1 is determined to be +300 μm.

As described above, the optical module 10 includes the FPC 16, a wiring pattern (for example, the signal pattern), and the cover material C. The aforementioned wiring pattern has the electrode pad 16a with a predetermined width and the microstripline M having a width smaller than the aforementioned predetermined width and connected to the electrode pad 16a on the FPC 16. The cover material C covers the part of the electrode pad 16a and the microstripline M. Therefore, the microstripline M is not exposed from the cover material C regardless of the manufacturing error of the cover material C. As a result, disconnection due to the separation of the microstripline M is suppressed.

First Modified Embodiment

The first modified embodiment will be described next. An optical module according to the first modified embodiment has a configuration similar to that of the optical module 10 according to the above-described embodiment except for a pattern shape on the rear surface of the FPC 16. Therefore, in the first modified embodiment, components common to those of the above-described embodiment will be denoted by the same reference numerals and the detailed description thereof will be omitted.

While disconnection is suppressed in the optical module 10 according to the above-described embodiment, there is a concern about a deviation of the characteristic impedance from the ideal value of 50Ω since the part of the electrode pad 16a is covered by the cover material C. More specifically, if part of the electrode pad 16a is covered by the cover material C, the covered portion is not solder-connected to the PCB 17. Therefore, despite that it is the electrode pad 16a, there is a portion where no solder connection is made. Thus, the impedance at this portion does not match the impedance at the other portions (the solder-connected portion of the electrode pad 16a and the microstripline M). As a result, the characteristic impedance at the connection may be deviated from 50Ω. Such an impedance mismatch becomes a factor for increasing the reflection of a high-frequency signal and thereby deteriorating the high-frequency characteristics.

Figure 5:
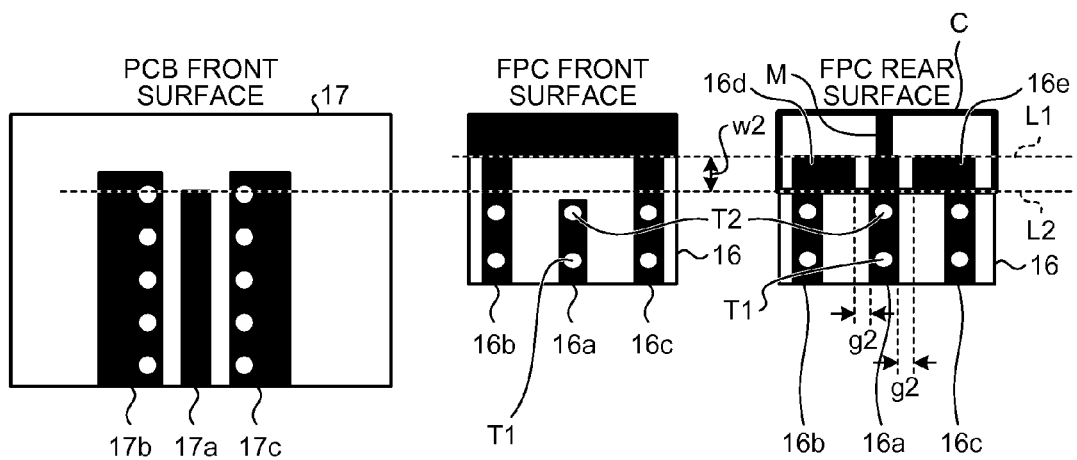
FIG. 5 is a diagram illustrating the front surface of the PCB and the front surface and rear surface of the FPC according to a first modified embodiment.

In view of this, the aforementioned impedance is adjusted in the optical module 10 according to the first modified embodiment. FIG. 5 is a diagram illustrating the front surface of the PCB 17 and the front surface and rear surface of the FPC 16 according to the first modified embodiment. As illustrated in FIG. 5, a coplanar waveguide (CPW) 16d is formed on the rear surface of the FPC 16 so that a tip of the ground pattern 16b is bent toward the electrode pad 16a. Similarly, a CPW 16e is formed so that a tip of the ground pattern 16c is bent toward the electrode pad 16a. Each of the CPWs 16d and 16e has a width w2 corresponding to an interval between the aforementioned broken lines L1 and L2. Also, there is a gap g2 smaller than a gap g1 in FIG. 4 between a tip of the left CPW 16d and the electrode pad 16a. Similarly, there is the gap g2 smaller than the gap g1 in FIG. 4 between a tip of the right CPW 16e and the electrode pad 16a. Moreover, the cover material C is provided on the rear surface of the FPC 16 so that a tip thereof coincides with lower ends of the CPWs 16d and 16e.

Examples of a parameter for adjusting the aforementioned characteristic impedance may include a width of the signal pattern (electrode pad 16a), an interval between the signal pattern and the ground pattern, a thickness (for example, 25 to 50 μm) of the FPC 16, etc. Therefore, a manufacturer of the optical module 10 can make the characteristic impedance approximate 50Ω by adjusting the gap g2 which is the interval between the signal pattern and the ground pattern to an appropriate value. Note that the gap g2 is about several ten to 100 μm, for example.

The CPWs 16d and 16e are made of copper foil, for example. Note however that the CPWs 16d and 16e are not necessarily requested to be made of the same material as the other patterns. Moreover, the shape of the CPWs 16d and 16e is not limited to a rectangular shape. Any shape such as a trapezoidal shape, a semicircular shape, a rhomboid shape, and a combination thereof may be employed within a range capable of adjusting the impedance to a proper value. Furthermore, the two CPWs 16d and 16e formed on both sides of the electrode pad 16a do not necessarily have the same shape.

As described above, the optical module 10 according to the first modified embodiment further includes the ground patterns 16b and 16c and the CPWs 16d and 16e. The ground patterns 16b and 16c are formed on both sides of the aforementioned wiring pattern. The CPWs 16d and 16e are connected to the ground patterns 16b and 16c, respectively, and extend toward the part of the electrode pad 16a. This achieves the suppression of the aforementioned impedance mismatch. Therefore, the reflection of a high-frequency signal is reduced. As a result, the high-frequency characteristics are improved.

Second Modified Embodiment

The second modified embodiment will be described next. An optical module according to the second modified embodiment has a configuration similar to that of the optical module 10 according to the above-described embodiment except for a pattern shape of the front surface of the FPC 16. Therefore, in the second modified embodiment, components common to those of the above-described embodiment will be denoted by the same reference numerals and the detailed description thereof will be omitted.

In the optical module 10 according to the above-described first modified embodiment, the gap g2 in FIG. 5 is as narrow as several ten to 100 μm. Therefore, if the CPWs 16d and 16e are exposed for the reason that the cover material C has been retreated toward the package 14, or the like, there is a possibility that the solder flows in between the signal pattern (electrode pad 16a) and the ground patterns (CPWs 16d and 16e). Thus, there is a concern about the generation of a short circuit due to a solder bridge.

Figure 6:
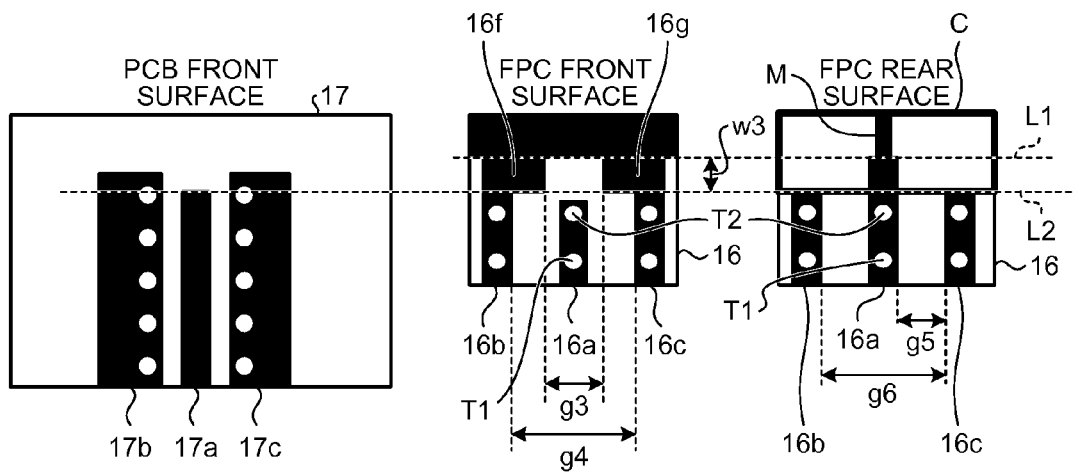
FIG. 6 is a diagram illustrating the front surface of the PCB and the front surface and rear surface of the FPC according to a second modified embodiment.

In view of this, in the optical module 10 according to the second modified embodiment, the ground patterns formed on the front surface of the FPC 16 where no solder connection is made are brought closer to the signal pattern instead of those formed on the rear surface of the FPC 16 where solder connection is made. FIG. 6 is a diagram illustrating the front surface of the PCB 17 and the front surface and rear surface of the FPC 16 according to the second modified embodiment. As illustrated in FIG. 6, a ground pattern 16f is formed on the front surface of the FPC 16 so that a tip of the ground pattern 16b is bent toward the electrode pad 16a side (center side). Similarly, a ground pattern 16g is formed so that a tip of the ground pattern 16c is bent toward the electrode pad 16a side. Each of the ground patterns 16f and 16g has a width w3 corresponding to an interval between the aforementioned broken lines L1 and L2. Also, there is a gap g3 greater than a gap g5 on the rear surface of the FPC 16 and smaller than gaps g4 and g6 between the ground pattern 16f and the ground pattern 16g.

Therefore, a manufacturer of the optical module 10 can indirectly adjust the interval between the signal pattern and the ground pattern by adjusting the gap g3 which is the interval between the ground patterns 16f and 16g to an appropriate value, thereby making the characteristic impedance approximate 50Ω. Note that the gap g3 is about 520 μm, for example. The gap g4 is about 1 mm, for example.

The ground patterns 16f and 16g are made of a copper foil, for example. Note however that the ground patterns 16f and 16g are not necessarily requested to be made of the same material as the other patterns. Moreover, the shape of the ground patterns 16f and 16g is not limited to a rectangular shape. Any shape such as a trapezoidal shape, a semicircular shape, a rhomboid shape, and a combination thereof may be employed within a range capable of adjusting the impedance to a proper value. Furthermore, the ground patterns 16f and 16g do not necessarily have the same shape.

Figure 7:
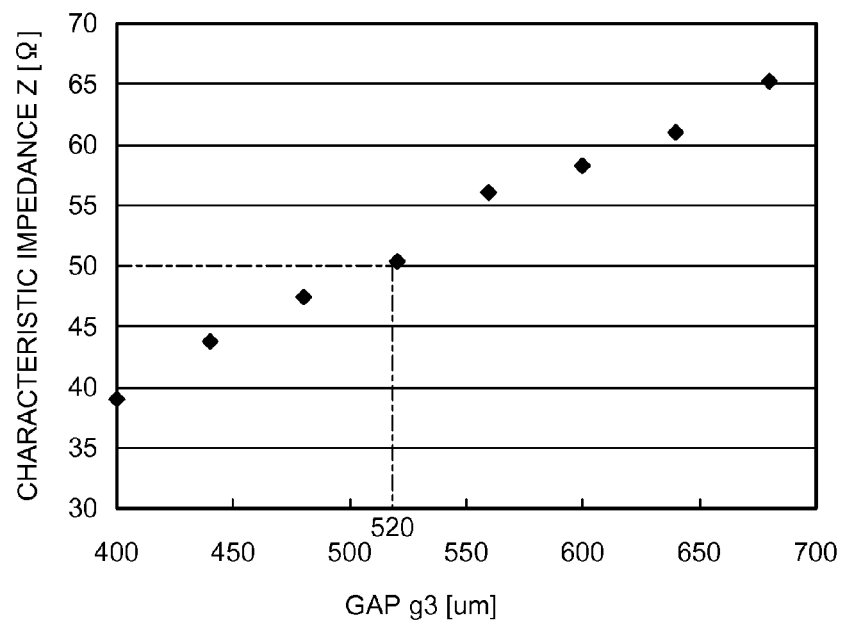
FIG. 7 is a graph illustrating a relationship between a gap between ground patterns and a characteristic impedance.

FIG. 7 is a graph illustrating a relationship between the gap g3 between the ground patterns 16f and 16g and a characteristic impedance Z. In FIG. 7, the x-axis thereof defines the gap g3 (unit: μm) illustrated in FIG. 6 and the y-axis thereof defines the characteristic impedance Z (unit: Ω). As represented in FIG. 7, the characteristic impedance Z at the connection is reduced as the gap g3 is narrowed, i.e., as the ground patterns 16f and 16g on both sides thereof are brought closer to each other. It can be seen from FIG. 7 that the interval between the ground patterns 16f and 16g may be adjusted so that the gap g3 equals 520 μm in order to make the characteristic impedance Z equal to the ideal value of 50Ω.

As described above, the optical module 10 according to the second modified embodiment further includes the ground patterns 16b and 16c and the ground patterns 16f and 16g. The ground patterns 16b and 16c are formed on both sides of a position corresponding to the aforementioned wiring pattern on the surface different from the aforementioned wiring pattern. The ground patterns 16f and 16g are connected to the ground patterns 16b and 16c, respectively, and extend toward a position corresponding to the part of the electrode pad 16a on the surface different from the aforementioned wiring pattern. In other words, the ground patterns 16b, 16c, 16f, and 16g are formed on the front surface of the FPC 16 so as to surround the electrode pad 16a serving as a signal pattern. According to the optical module 10 of the second modified embodiment, the gap g3 for adjusting the characteristic impedance is formed on the front surface side where the solder is less likely to flow in. Therefore, the characteristic impedance can be adjusted while avoiding a short circuit.

Third Modified Embodiment

The third modified embodiment will be described next. An optical module according to the third modified embodiment has a configuration similar to that of the optical module 10 according to the second modified embodiment except for a pattern shape of the front surface of the FPC 16. Therefore, in the third modified embodiment, components common to those of the second modified embodiment will be denoted by the same reference numerals and the detailed description thereof will be omitted.

In the optical module 10 according to the above-described second modified embodiment, the gap g4 between the ground patterns 16b and 16c is set wider than the gap g3 between the ground patterns 16f and 16g in order to prevent the electrode pad 16a and the ground patterns 16b and 16c from short-circuiting on the front surface of the FPC 16. If a difference between the gap g4 and the gap g3 is too large, however, the gap steeply changes at a boundary line therebetween. Therefore, at this changing point, there is a possibility of generating an impedance mismatch and eventually the reflection of a microwave. The reflection of a microwave becomes a factor for deteriorating the high-frequency characteristics.

Figure 8:
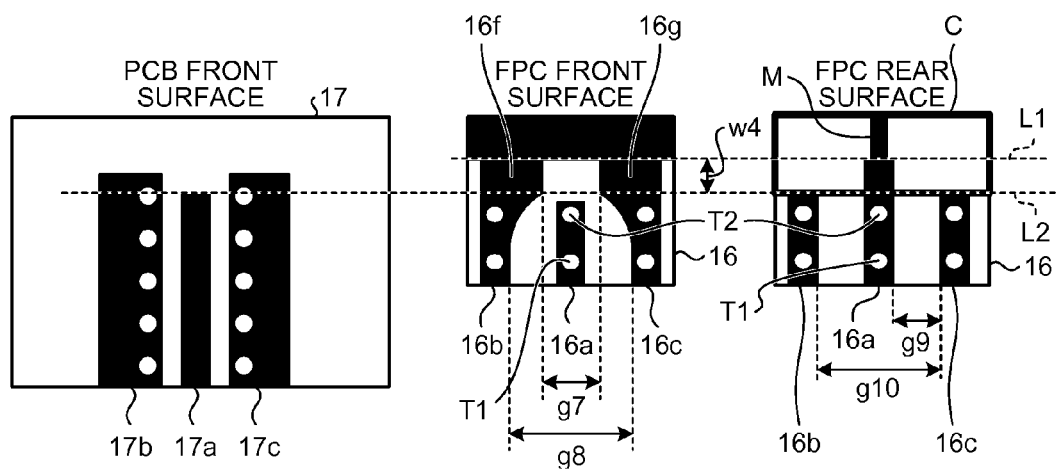
FIG. 8 is a diagram illustrating the front surface of the PCB and the front surface and rear surface of the FPC according to a third modified embodiment.

In view of this, in the optical module 10 according to the third modified embodiment, an interval between ground patterns formed on both sides of the electrode pad 16a on the front surface of the FPC 16 gradually changes. FIG. 8 is a diagram illustrating the front surface of the PCB 17 and the front surface and rear surface of the FPC 16 according to the third modified embodiment. As illustrated in FIG. 8, a gap between the ground patterns 16b and 16c formed on the front surface of the FPC 16 is continuously changed from the broken line L2 toward an end of the FPC 16 so as to be gradually changed from a gap g7 to a gap g8. In other words, the width of the ground pattern 16b is gradually increased toward the connection between the ground pattern 16b and the ground pattern 16f. Similarly, the width of the ground pattern 16c is gradually increased toward the connection between the ground pattern 16c and the ground pattern 16g. This reduces the aforementioned gap change and thereby suppresses the reflection of a microwave.

Note that the gap between the ground patterns 16b and 16c is not necessarily requested to change in a curved manner. Such a change may occur in any manner such as a tapered manner or a stepwise manner, for example, within a range capable of suppressing the aforementioned reflection.

Fourth Modified Embodiment

The fourth modified embodiment will be described next. An optical module according to the fourth modified embodiment has a configuration similar to that of the optical module 10 according to the third modified embodiment except for a pattern shape of the FPC 16. Therefore, in the fourth modified embodiment, components common to those of the third modified embodiment will be denoted by the same reference numerals and the detailed description thereof will be omitted.

In the optical module 10 according to the above-described third modified embodiment, while the steep gap change at the broken line L2 is suppressed, a change at the broken line L1 still remains. More specifically, on the front surface of the FPC 16, a portion illustrated in FIG. 8 where the gap g7 is terminated makes a point of discontinuity. On the rear surface of the FPC 16, the boundary between the electrode pad 16a and the microstripline M makes a point of discontinuity. Therefore, there is a possibility that a microwave is reflected at these points of discontinuity. The reflection of a microwave becomes a factor for deteriorating the high-frequency characteristics.

Figure 9:
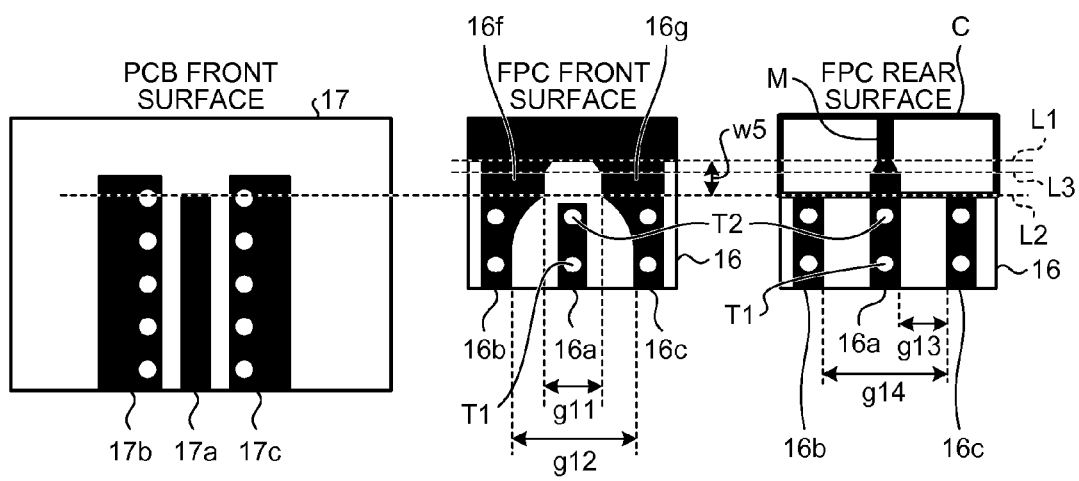
FIG. 9 is a diagram illustrating the front surface of the PCB and the front surface and rear surface of the FPC according to a fourth modified embodiment.

In view of this, in the optical module 10 according to the fourth modified embodiment, the steep change at the broken line L1 is also reduced in addition to that at the broken line L2. FIG. 9 is a diagram illustrating the front surface of the PCB 17 and the front surface and rear surface of the FPC 16 according to the fourth modified embodiment. As illustrated in FIG. 9, the signal line width of the electrode pad 16a formed on the rear surface of the FPC 16 is changed in a continuously-narrowed manner from a broken line L3 toward the broken line L1 (the start line of the microstripline M). Corresponding to such a change, a gap between the ground patterns 16f and 16g formed on the front surface of the FPC 16 is continuously changed from the broken line L3 toward the broken line L1 so as to be gradually reduced from a gap g11. In other words, the width of part of the electrode pad 16a is gradually reduced toward the connection between the part of the electrode pad 16a and the microstripline M. This reduces the aforementioned gap change and thereby suppresses the reflection of a microwave.

Note that the signal line width on the rear surface of the FPC 16 may be continuously changed from the broken line L2 toward the broken line L1. Similarly, the gap between the ground patterns 16f and 16g on the front surface of the FPC 16 may be continuously changed from the broken line L2 toward the broken line L1. Moreover, how to change is not necessarily limited to the change in a tapered manner. Such a change may occur in any manner such as a curved manner or a stepwise manner, for example, within a range capable of suppressing the aforementioned reflection.

Application Example

Figure 10:
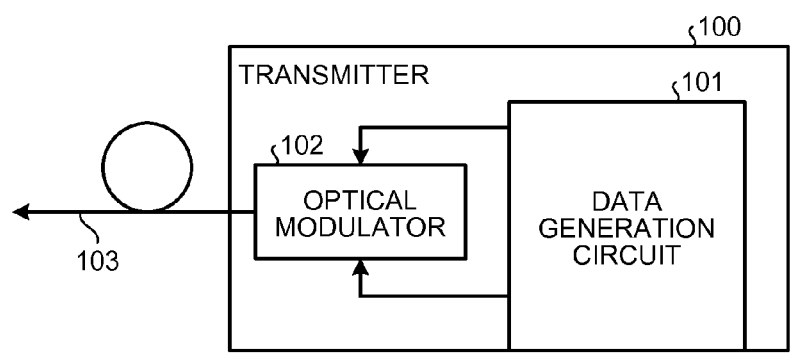
FIG. 10 is a diagram illustrating a configuration of a transmitter in which the optical module according to any one of the above-described embodiment and modified embodiments is mounted.

An optical modulator employing the above-described optical module 10 may be effectively applied to a transmitter, for example, since such an optical modulator can simultaneously achieve high reliability and high mountability. FIG. 10 is a diagram illustrating a configuration of a transmitter 100 in which the optical module 10 according to any one of the above-described embodiment and modified embodiments is mounted. As illustrated in FIG. 10, the transmitter 100 includes a data generation circuit 101, an optical modulator 102, and an optical fiber 103. These components are connected to one another unidirectionally or bidirectionally so as to enable the input and output of various signals or data. Data generated by the data generation circuit 101 is converted from an electric signal into an optical signal by the optical modulator 102. The data is then transmitted to the outside of the device with the optical fiber 103 used as a transmission medium. Note that the optical module 10 may be applied to a receiver without being limited to the transmitter.

While the microstripline M is formed on the rear surface of the FPC 16 in the above-described embodiment and modified embodiments, the microstripline M may be formed on the front surface thereof. Moreover, a circuit substrate to which the above-described embodiment and modified embodiments are applied is not limited to the FPC. The above-described embodiment and modified embodiments may be applied to a PCB or the like. Furthermore, the signal pattern formed at the tip (package 14 side) of the electrode pad 16a is not limited to the microstripline. The signal pattern may be a CPW, for example.

Moreover, in the description set forth above, the individual configuration and operation have been described for each of the embodiment and modified embodiments. However, the optical modules 10 according to the above-described embodiment and modified embodiments each may also have a component characteristic of any one of the other modified embodiments. Moreover, a combination of the embodiment and modified embodiments is not limited to two. Any configuration is possible such as a combination of three or more of the embodiment and modified embodiments. For example, the optical module 10 according to the above-described embodiment may have the ground patterns 16f and 16g according to the fourth modified embodiment on the front surface of the FPC 16. Alternatively, the optical module 10 according to the first modified embodiment may have the ground patterns 16f and 16g according to the third modified embodiment on the front surface of the FPC 16. Furthermore, a single optical module 10 may possess all the components described in the above-described embodiment and first to fourth modified embodiments within a compatible range.

According to the embodiment of the optical module disclosed by the present application, disconnection can be suppressed.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical module comprising:
    a substrate;
    a wiring pattern that includes, on the substrate, an electrode portion having a predetermined width and a signal line having a width smaller than the predetermined width and connected to the electrode portion; and
    a cover material that covers a part of the electrode portion and the signal line, wherein
    a tip of the cover material is positioned on a side of a first ground pattern, which is formed on both sides of the wiring pattern, at a predetermined position, and
    a width to extend the cover material is variably determined depending on a manufacturing error of the cover material.

2. The optical module according to claim 1, further including:
    a waveguide pattern connected to the first ground pattern and extending toward the part of the electrode portion.

3. The optical module according to claim 1, further including:
    a second ground pattern formed on both sides of a position facing the wiring pattern on a surface different from the wiring pattern; and
    a third ground pattern connected to the second ground pattern and extending toward a position facing the part of the electrode portion on the surface different from the wiring pattern.

4. The optical module according to claim 3, wherein the second ground pattern has a width increasing toward a connection portion between the second ground pattern and the third ground pattern.

5. The optical module according to claim 1, wherein the part of the electrode portion has a width reducing toward a connection portion between the part of the electrode portion and the signal line.

* * * * *